(12) United States Patent
Fields et al.

(10) Patent No.: US 8,920,620 B2
(45) Date of Patent: Dec. 30, 2014

(54) ELECTRICALLY ISOLATING POLYMER COMPOSITION

(75) Inventors: Lenwood L. Fields, Painted Post, NY (US); Arthur W. Martin, Horseheads, NY (US); Shawn M. O'Malley, Horseheads, NY (US); Dean M. Thelen, Addison, NY (US)

(73) Assignee: Corning Incorporated, Corning, NY (US)

( * ) Notice: Subject to any disclaimer, the term of this patent is extended or adjusted under 35 U.S.C. 154(b) by 377 days.

(21) Appl. No.: 13/280,814

(22) Filed: Oct. 25, 2011

(65) Prior Publication Data

US 2012/0037400 A1 Feb. 16, 2012

Related U.S. Application Data

(62) Division of application No. 12/393,296, filed on Feb. 26, 2009, now abandoned.

(51) Int. Cl.

| | | |
|---|---|---|
| *C25D 13/04* | (2006.01) | |
| *C25D 13/06* | (2006.01) | |
| *C25D 1/18* | (2006.01) | |
| *C08L 37/00* | (2006.01) | |
| *C08L 31/02* | (2006.01) | |
| *C08L 79/02* | (2006.01) | |
| *C09D 133/16* | (2006.01) | |
| *C08F 220/24* | (2006.01) | |
| *C09D 4/00* | (2006.01) | |
| *H01B 3/44* | (2006.01) | |
| *C08F 222/10* | (2006.01) | |

(52) U.S. Cl.
CPC ............ *C09D 133/16* (2013.01); *C08F 220/24* (2013.01); *C09D 4/00* (2013.01); *H01B 3/447* (2013.01); *C08F 222/1006* (2013.01)
USPC ............ 204/471; 524/549; 524/556; 524/599

(58) Field of Classification Search
USPC ......... 524/500, 502, 543, 544, 545, 546, 549, 524/551, 556, 559, 599, 601; 174/126.1; 204/471
See application file for complete search history.

(56) References Cited

U.S. PATENT DOCUMENTS

| | | | | |
|---|---|---|---|---|
| 4,468,432 | A | 8/1984 | Matsukura et al. | 428/328 |
| 5,929,137 | A | 7/1999 | Marsac et al. | 523/205 |
| 6,451,047 | B2 | 9/2002 | McCrea et al. | 623/1.13 |
| 6,451,947 | B1 * | 9/2002 | Benz et al. | 526/310 |
| 6,761,975 | B1 * | 7/2004 | Chen et al. | 428/429 |
| 6,879,861 | B2 | 4/2005 | Benz et al. | 607/116 |
| 2004/0097629 | A1 | 5/2004 | Aichele et al. | 524/431 |
| 2008/0225378 | A1 | 9/2008 | Weikert et al. | 359/319 |

FOREIGN PATENT DOCUMENTS

| | | | |
|---|---|---|---|
| EP | 0 170 913 A2 | 2/1986 | |
| EP | 0430 722 A2 | 3/1989 | |
| EP | 430722 A2 * | 6/1991 | ............ C08F 14/18 |

OTHER PUBLICATIONS

C.P. Chwang, et al., "Synthesis and characterization of high dielectric constant polyaniline/polyurethane blends", *Synthetic Metals*, vol. 142, 2004, pp. 275-281.
Z.M. Dang, et al., "Dielectric behavior and dependence of percolation threshold on the conductivity of fillers in polymer-semiconductor composites", *Applied Physics Letters*, vol. 85, No. 1, Jul. 5, 2004, pp. 97-99.
C. Huang, et al., "All-organic dielectric-percolative three-component composite materials with high electromechanical response", *Applied Physics Letters*, vol. 84, No. 22, May 31, 2004, pp. 4391-4393.
M.K. Kilaru, et al., "Strong charge trapping and bistable electrowetting on nanocomposite fluoropolymer :BaTiO3 dielectrics", *Applied Physics Letters*, vol. 90, 2007, pp. 212906-1-212906-3.
J. Lu, et al., "High dielectric constant polyaniline/epoxy composites via in situ polymerization for embedded capacitor applications", *Polymer*, vol. 48, 2007, pp. 1510-1516.
Q.M. Zhang, et al., "An all-organic composite actuator material with a high dielectric constant", *Nature*, vol. 419, Sep. 19, 2002, pp. 284-287.

* cited by examiner

*Primary Examiner* — Karuna P Reddy
(74) *Attorney, Agent, or Firm* — John L. Haack

(57) ABSTRACT

A composition that includes at least one crosslinkable monomer; at least one hydrophobic monomer; and at least one dielectric constant enhancing agent selected from dielectric enhancing monomers, ferroelectric particulates, and electroactive polymers. Coatings including the polymer of compositions, and articles including electrically isolating layers are also disclosed.

2 Claims, No Drawings

ELECTRICALLY ISOLATING POLYMER COMPOSITION

CROSS-REFERENCE TO RELATED APPLICATION(S)

This application is a divisional of U.S. Patent Application No. 12/393,296, filed on Feb. 26, 2009, now abandoned, the content of which is relied upon and incorporated herein by reference in its entirety, and the benefit of priority under 35 U.S.C. §120 is hereby claimed.

BACKGROUND

The disclosure relates to electrically isolating polymer compositions and coatings and articles including the same.

SUMMARY

The disclosure provides a composition that includes at least one crosslinkable monomer; at least one hydrophobic monomer; and at least one dielectric constant enhancing agent selected from the group consisting of: dielectric enhancing monomers, ferroelectric particulates, and electro-active polymers.

The disclosure provides a coating that includes the polymerized product of at least one crosslinkable monomer; at least one hydrophobic monomer; and at least one dielectric constant enhancing agent selected from the group consisting of: dielectric enhancing monomers, ferroelectric particulates, and electro-active polymers.

The disclosure provides an article that includes an electrically isolating layer that includes the polymerized product of at least one crosslinkable monomer; at least one hydrophobic monomer; and at least one dielectric constant enhancing agent selected from the group consisting of: dielectric enhancing monomers, ferroelectric particulates, and electro-active polymers.

DETAILED DESCRIPTION

Embodiments other than those specifically discussed herein are contemplated and may be made without departing from the scope or spirit of the present disclosure. The following detailed description is not limiting. The definitions provided are to facilitate understanding of certain terms frequently used and do not limit the disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g., 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification, use of a singular form of a term, can encompass embodiments including more than one of such term, unless the content clearly dictates otherwise. For example, the phrase "adding a solvent" encompasses adding one solvent, or more than one solvent, unless the content clearly dictates otherwise. As used in this specification and the appended claims, the term "or" is generally employed in its sense including "either or both" unless the context clearly dictates otherwise.

"Include," "including," or like terms means encompassing but not limited to, that is, inclusive and not exclusive.

The disclosure provides compositions, coatings including such compositions, and articles including such compositions. Compositions, coatings, and articles including such compositions can have various properties. In embodiments, the compositions can provide a physical barrier for electrode and electronic coatings that have the combined properties of high resistance to water penetration, high voltage breakdown, relatively high dielectric constant, and are highly hydrophobic.

Electrowetting devices commonly utilize both an inorganic film and an upper hydrophobic film to provide barrier protection to electrowetting electrodes. However, such a multilayer barrier has not been able to afford fabrication of devices that are sufficiently robust to withstand electrical breakdown while in direct contact with liquid. The present disclosure provides electrically isolating coatings that also provide a physical barrier for water penetration especially in electrowetting applications.

In embodiments, the disclosure provides compositions that can be pre-polymer compositions or polymeric compositions. A pre-polymer composition is generally a composition that can be polymerized to form a polymeric composition. A pre-polymer composition can include one or more monomers. As used in this specification, monomer generally has the meaning given it by those of skill in the art. Specifically, a monomer is a relatively small molecule that may become chemically bonded to other monomers to form a larger molecule, which can be referred to as a polymer. The process of chemically bonding one or more monomers to one or more other monomers to form a polymer can be referred to as polymerization.

An exemplary composition can include at least one crosslinkable monomer, at least one hydrophobic monomer, and at least one dielectric enhancing agent. A composition can include, for example, one or more than one kind of crosslinkable monomer, one or more than one kind of hydrophobic monomer, and one or more than one kind of dielectric enhancing agent.

A crosslinkable monomer generally refers to a molecule which can be polymerized and can also allow the resulting polymer to be crosslinked at such a monomer. Generally, a crosslink refers to a bond that links one polymer chain to another polymer chain, or a bond that links one portion of a polymer chain to another portion of the same polymer chain. A crosslinkable monomer includes one portion of the molecule that can be polymerized and one portion of the molecule that can form a chemical bond with some other portion of the polymer. The portion of the molecule that can form a chemical bond with some other portion of the polymer (or a different polymer chain) can be referred to as the crosslinkable moiety. Crosslinking can occur, for example, during polymerization or after polymerization.

The crosslinkable moiety can be the same or different than the portion of the molecule that can be utilized to form the polymer (the polymerizable moiety). In embodiments, the crosslinkable moiety can be the same as the polymerizable moiety. In embodiments, the crosslinkable moiety can be different than the polymerizable moiety. A crosslinkable monomer can include one crosslinkable moiety or more than one crosslinkable moiety.

In embodiments, a crosslinkable monomer includes a polymerizable moiety and at least one crosslinkable moiety. A crosslinkable monomer that includes a polymerizable moiety and one crosslinkable moiety can be referred to as a difunctional monomer. In embodiments, a crosslinkable monomer includes a polymerizable moiety and at least two crosslinkable moieties. A crosslinkable monomer that includes a polymerizable moiety and two crosslinkable moieties can be referred to as a trifunctional monomer. In embodiments, a crosslinkable monomer can include a polymerizable moiety having at least three crosslinkable moieties. A crosslinkable monomer that includes a polymerizable moiety and three crosslinkable moieties can be referred to as a tetrafunctional monomer. In embodiments, a crosslinkable monomer can include a polymerizable moiety and at least four crosslinkable moieties. A crosslinkable monomer that includes a polymerizable moiety and four crosslinkable moieties can be referred to as a pentafunctional monomer. In embodiments, a crosslinkable monomer can include a polymerizable moiety and at least five crosslinkable moieties. A crosslinkable monomer that includes a polymerizable moiety and five crosslinkable moieties can be referred to as a hexafunctional monomer.

In embodiments, a crosslinkable monomer can include any type of functional moieties. Exemplary functional moieties include organic moieties such as acrylate moieties, epoxy moieties, urethane moieties, and imide moieties for example. Exemplary functional moieties can also include inorganic moieties, such as siloxane moieties and phosphazene moieties. In embodiments, a crosslinkable monomer can include an acrylate moiety.

In embodiments, a composition can include more than one type of crosslinkable monomer. For example, a composition can include at least two types of crosslinkable monomers. In embodiments, a composition can include one kind of crosslinkable monomer and a hydrophobic monomer that is also crosslinkable (includes a polymerizable moiety and at least one crosslinkable moiety) to modulate the miscibility of the composition. For example, the crosslinkable monomer (or crosslinkable monomers) can be less miscible with the remaining constituents of the composition so a hydrophobic monomer (which is also crosslinkable) can be added to increase the overall miscibility of the composition.

Specific exemplary types of crosslinkable monomers can include, for example, ethoxylated acrylate monomers, such as ethoxylated propane triacrylate monomers and ethoxylated pentaerythritol tetraacrylate. Specific crosslinkable monomers that can be used include, for example, ethoxylated (15) trimethoylol propane triacrylate, ethoxylated (5) trimethoylol propane tetraacrylate, ethoxylated (5) pentaerythritol tetraacrylate, dipentaerythritol pentacrylate, dipentaerythritol hexaacrylate, methacryl polyhedral oligomeric silsesquioxane (POSS®), and like monomers, or combinations thereof.

A composition can include various amounts of one or more crosslinkable monomers. Higher amounts of crosslinkable monomers can result in polymers (polymerized compositions) that are more highly crosslinked and therefore are likely to be relatively stiff. In embodiments, a composition can include from about 5% to about 30% of crosslinkable monomer by weight of the total composition (without solvent). In embodiments, a composition can include from about 15% to about 25% of crosslinkable monomer by weight of the total composition (without solvent). In embodiments, a composition can include about 20% of crosslinkable monomer by weight of the total composition (without solvent).

As discussed above, a composition also includes at least one hydrophobic monomer. As used in this specification, hydrophobic generally has the meaning given it by those of skill in the art. Specifically, hydrophobic means antagonistic to water, mostly incapable of dissolving in water in any appreciable amount or being repelled from water. Hydrophobic molecules tend to be nonpolar and thus prefer other neutral molecules and nonpolar solvents. Exemplary hydrophobic molecules include fluorine containing molecules, alkanes, oils, fats, and greasy substances in general.

A hydrophobic monomer can include a polymerizable moiety and at least one hydrophobic moiety, for example a moiety that is non-polar. Exemplary hydrophobic moieties can include, for example, fluorinated moieties or alkyl moieties. In embodiments, a hydrophobic monomer is one that includes five (5) or more fluorine atoms, eight (8) or more fluorine atoms, sixteen (16) or more fluorine atoms, or twenty three (23) or more fluorine atoms. In embodiments, a hydrophobic monomer is one that includes an alkyl chain having at least six (6) carbon atoms, at least twelve (12) carbon atoms, or at least eighteen (18) carbon atoms.

Exemplary specific types of hydrophobic monomers include perfluorinated compounds, or long chain alkyl compounds. Specific exemplary perfluorinated hydrophobic monomers include, for example, pentafluorobenzyl methacrylate; pentafluorophenyl methacrylate; 2,2,3,3,3-pentafluoropropyl acrylate; 2,2,3,3,4,4,5,5-octafluoropentyl methacrylate; 4,4,5,5,6,7,7,7-octacfluoro-2-hydroxy-6-(trifluoromethyl)heptyl methacrylate; 2,2,2,3,3,4,4,5,5,6,6,7,7-dodecafluoroheptyl acrylate; 2,2,3,3,4,4,5,5,6,6,7,7,8,8,9,9-hexadecafluorononyl acrylate; 3,3,4,4,5,5,6,6,7,7,8,8,9,9,10,10,11,11,12,12,12-eicosafluorodocecyl acrylate; and combinations thereof. Specific exemplary long chain hydrophobic monomers can include, for example, lauryl methacrylate, stearyl methacrylate, and combinations thereof.

As discussed above, hydrophobic monomers can include a crosslinkable moiety as well. This can be beneficial if the miscibility of the composition is a concern. Exemplary hydrophobic monomers that are also crosslinkable and that may be added to alter the miscibility of the composition include, for example, hexafluoro bisphenol A dimethacrylate; 1H,1H, 6H, 6H-octafluoro-1,6-hexanediol dimethacrylate; 1H,1H, 5H, 5H-hexafluoro-1,4-pentanediol dimethacrylate; pentaerythritol diacrylate monostearate, pentafluorobenzyl methacrylate, pentafluorophenyl methacrylate, and combinations thereof.

In embodiments, a composition can include more than one type of hydrophobic monomer. For example, a composition can include at least two types of hydrophobic monomers (e.g., a hydrophobic monomer and a hydrophobic monomer that is crosslinkable). A monomer that includes a hydrophobic moiety but is crosslinkable (e.g., includes a polymerizable moiety and at least one crosslinkable moiety) is considered a hydrophobic monomer. A composition can include various amounts of one or more hydrophobic monomers. Higher amounts of hydrophobic monomers can result in polymers (polymerized compositions) that are more hydrophobic and can therefore have a higher contact angle with water. In embodiments, a composition can include, for example, from about 20% to about 85% of hydrophobic monomer by weight of the total composition (without solvent). In embodiments, a composition can include, for example, from about 50% to about 80% of hydrophobic monomer by weight of the total composition (without solvent). In embodiments, a composition can include, for example, from about 60% to about 80% of hydrophobic monomer by weight of the total composition (without solvent).

As discussed above, a composition also includes at least one dielectric constant enhancing agent. Dielectric enhancing agents can include, for example, dielectric enhancing monomers, ferroelectric particulates, electroactive particles (such as electroactive polymers and conductive nanometal particles), and like agents, or a combination thereof A composition can include one or more than one kind of dielectric enhancing agent, for example, a composition can include one or more than one dielectric enchaining monomer and one or more than one ferroelectric particulate. A composition can include one or more than one particular kind of dielectric enhancing agent, for example, a composition can include at least two dielectric enhancing monomers or at least two dielectric enhancing monomers and one or more than one electroactive polymer.

Dielectric enhancing monomers are monomers that include a polymerizable moiety and a dipole moiety. A dipole moiety generally includes atoms or groups of atoms with opposite electrical charges (full or partial charges) that are separated by an inter-atomic or inter-molecular distance. The polarization strength of the dipole moiety is the result of the group electronegativity. Electronegativity is the tendency of an atom to attract electrons and group electronegativity is the tendency of a polyatomic group to attract electrons. In embodiments, a dielectric enhancing monomer that can be utilized can have a group electronegativity of at least about 2.4. The group electronegativity of a molecule, such as a monomer is a calculated property. The group electronegativity of a monomer can generally be calculated irrespective of its inclusion in a polymer. Illustrative examples include, pentabromophenyl methacrylate (Poly Sciences, Inc., cat. #04253) has a group electronegativity of 3.00; and ethoxylated bisphenol dimethacrylate (Sartomer SR348) has a group electronegativity of 2.74. The group electronegativities of these monomers were calculated using $DMol^3$ (Accelrys Software, Inc., San Diego, Calif.). $DMol^3$ obtained the calculation of the Electron Affinity and Ionization Energy for each molecule. Using these values the group electronegativity was then determined using Mulliken's formula (EA+IE)/2.

Specific types of dielectric enhancing monomers include monomers that contain halogen molecules or monomers that include group (IV) elements, such as zirconium and hafnium. Exemplary monomers that include group (IV) elements include, for example, zirconium acrylate, zirconium bromonorbornanelactone carboxylate triacrylate, zirconium carboxyethyl acrylate 60% (n-propanol), hafnium carboxyethyl acrylate 60% in 1-butanol, and like monomers, or a combination thereof. Other specific exemplary dielectric enhancing monomers include, for example, pentabromophenyl methacrylate, ethoxylated bisphenol dimethacrylate, tris(2-hydroxyethyl) isocyanurate, furfuryl methacrylate, benzylmethacrylate, 2-cyanoethylacrylate, vinylferrocene, propagyl methacrylate, and like monomers, or a combination thereof.

In embodiments, a composition can include more than one type of dielectric enhancing monomer. For example, a composition can include at least two types of dielectric enhancing monomers. A monomer that includes a dipole moiety but is crosslinkable (e.g., includes a polymerizable moiety and at least one crosslinkable moiety) is considered a dielectric enhancing monomer. A composition can include various amounts of one or more dielectric enhancing monomers. Higher amounts of dielectric enhancing monomers can result in polymers (polymerized compositions) that have higher dielectric constants and are therefore better electrical isolators. In embodiments, a composition can include, for example, from about 10% to about 60% of dielectric enhancing monomer by weight of the total composition (without solvent). In embodiments, a composition can include, for example, from about 20% to about 60% of dielectric enhancing monomer by weight of the total composition (without solvent).

Ferroelectric particulates can also be selected as a dielectric enhancing agent. Ferroelectric particulates can be used alone as the only dielectric enhancing agent in a composition, or can be used in combination with one or more other dielectric enhancing agents in the composition. Ferroelectric particulates are materials that have high dielectric constants. In embodiments, ferroelectric particulates are materials that have a dielectric constant that is at least about 10, at least about 20, at least about 70, or at least about 160, including intermediate dielectric constant values and ranges.

Exemplary types of ferroelectric particulates can include, for example, titanates, zirconates, and like other inorganic ceramic particles, or a combination thereof. Specific exemplary ferroelectric particulates include barium titanate ($BaTiO_3$), aluminum titanate ($AlTiO_3$), barium zirconate ($BaZrO_3$), alumina ($Al_2O_3$), $Y_3N_5O_{12}$, barium strontium zirconate titanate ("BSZT") (($Ba_{1-x}Sr_x$)($Zr_xTi_{1-x}$)$O_3$), fullerenes, and like ferroelectric particulates, or a combination thereof.

In embodiments, a composition can include more than one type of ferroelectric particulate. For example, a composition can include at least two types of ferroelectric particulates. A composition can include various amounts of one or more ferroelectric particulates. Higher amounts of ferroelectric particulates can result in polymers (polymerized compositions) that have higher dielectric constants and are superior electrical isolators. In embodiments, a composition can include, for example, from about 5% to about 50% of ferroelectric particulate by weight of the total composition (without solvent). In embodiments, a composition can include from about 20% to about 40% of ferroelectric particulate by weight of the total composition (without solvent).

Electroactive polymers can also be utilized as a dielectric enhancing agent. Electroactive polymers are a class of polymers that can undergo shape changes when a voltage is applied. Electroactive polymers can be classified, for example, as dielectric electroactive polymers or ionic electroactive polymers. In the case of dielectric electroactive polymers the shape deformation can be caused by, for example, electrostatic forces when the polymer is located between two electrodes. For ionic electroactive polymers the shape deformation can be caused by, for example, the displacement of ions within the polymer. Either dielectric electroactive polymers, ionic electroactive polymers, or a combination thereof can be utilized. Electroactive polymers can either be used alone as the only dielectric enhancing agent in a composition or can be used in combination with one or more other dielectric enhancing agents in the composition. For example, a composition can include an electroactive polymer (EAP), and a dielectric enhancing monomer; or a composition could include an EAP, and ferroelectric particulates. In embodiments, electroactive polymers can be materials that have a dielectric constant that is at least about 5.

In embodiments, an electroactive polymer that can be used can have a chemistry that is conjugatable with the monomer components of the composition. This allows the electroactive polymer to be crosslinked into the overall polymer. In embodiments, the electroactive polymers can include pendant hydrophobic functional groups which may aid in dispersion, maintaining the overall hydrophobicity of the films, or both. Exemplary types of electroactive polymers include polythiophenes and polyanilines. Specific exemplary electroactive polymers include conducting polyaniline, copper (II) phthalocyanine, polypyrrole, polyacetylene, polyfluorene, poly(p-phenylene sulfide), polynaphthalene, polytetrathiafulvalene, thiophene polymer ADS 306 PT-EG (American Dye Source, Inc.), and like polymers, or a combination thereof.

In embodiments, a composition can include more than one type of electroactive polymer. For example, a composition can include at least two types of electroactive polymers. A composition can include various amounts of one or more electroactive polymers. Higher amounts of electroactive polymers can result in polymers (polymerized compositions) that have higher dielectric constants and are superior electrical isolators. In embodiments, a composition can include, for example, from about 2% to about 20% of electroactive polymer by weight of the total composition (without solvent), from about 6% to about 20% of electroactive polymer by weight of the total composition (without solvent), or from about 6% to about 10% of electroactive polymer by weight of the total composition (without solvent), including intermediate values and ranges.

A composition can also include other optional components. For example, a composition can include one or more initiators. Both thermal and photoinitiators can be utilized. In embodiments, a photoinitiator can be selected. Exemplary photoinitiators include, the IRGACURE® and DAROCUR® lines of initiators available from Ciba Specialty Chemicals (Basel, Switzerland). In embodiments, where an initiator is selected, the initiator can be used in amounts as commonly known. For example, an initiator can be added in an amount that is from about 1% to about 5% of the total composition (excluding solvent). In embodiments, the initiator can be added in an amount that is about 2% of the total composition (excluding solvent).

Other optional components can also be added to a composition. Such other optional components can include, for example, optical additives such as colorants, dyes, electroluminescent agents, luminescent agents, quantum dots, PDOTs, nano-metal-polymer composites, fluorescently doped silica nanoparticles, stabilizers, and like components, or a combination thereof.

A composition can be formed by combining the monomers with or without additional components, such as solvents. In embodiments, one or more than one monomers can be combined with one or more than one solvent. In embodiments that include relatively more hydrophobic monomer, the conditions (i.e., amount of solvent, order of monomer addition, or other conditions) can be adjusted to maintain the miscibility of the composition. In embodiments, compositions can be formed by combining dielectric enhancing monomer(s) with cross-linkable monomer(s) and then adding hydrophobic monomer(s) either with or without appropriate solvent(s), based, for example, on the identities and amounts of the monomers.

A composition as disclosed herein can be non-polymerized, partially polymerized, or completely polymerized. A composition that is at least partially polymerized can be referred to as a polymeric composition. A composition as disclosed herein can be coated onto a substrate to form a coating or a layer. Generally, a coating of a composition will be polymerized.

A coating of a disclosed composition can be formed as would be known to one of skill in the art, having read this specification. A specific method of forming a coating utilizing a disclosed composition can include a step of obtaining or forming a composition as disclosed above, coating the composition onto a substrate, and curing the composition to form a coating.

The particular coating method that is chosen may depend at least in part on the particular substrate that is being coated, the desired thickness of the coating, other considerations not mentioned herein, or a combination thereof. The particular coating method chosen may also dictate, at least in part whether or not solvent will be added to the composition, and if it is to be added, the quantity of solvent to be added. The particular coating method chosen may also dictate, at least in part whether or not other components will be added to the composition, and if so, the quantity of the components to be added. Specific methods of coating the composition can include, for example, spin coating, dip coating, spray coating, ultrasonic spray coating, vapor coating, electrospinning, knife blade doctoring, wire cater applications, RF magnetron sputtering, extrusion coating, curtain coating, meniscus coating, flexographic deposition, and like methods, or a combination thereof.

The step of curing the composition can be carried out as would be known to one of skill in the art, having read this specification. Exemplary curing methods include, for example, thermal curing, and electromagnetic curing including ultraviolet (UV), visible, microwave, infrared (IR), and like sources of actinic radiation.

Coatings formed from disclosed compositions can afford products having various advantageous properties, including physical barrier to water penetration, high dielectric constant, high voltage breakdown, and like properties, or a combination thereof. Coatings that are effective physical barriers to water penetration can have pin hole free coverage of substrates, high hydrophobicity, a relatively high strength or stiffness, or combinations thereof.

The integrity of a coating can be evaluated using various techniques to observe the micro- or nano-surface of the coating. Exemplary techniques include, for example, scanning electron microscopes (SEM), atomic force microscopy (AFM), ellipsometry, differential scanning calorimetry (DSC), dynamic mechanical analysis (DMA), nano-indentation, Fourier transform infrared spectroscopy (FTIR), and other like forms of optical microscopy. Using such techniques, a coating can be evaluated for numerous properties, including integrity, thermal stability, chemical uniformity, and in some instances the bulk absence of pinholes can be determined. Coatings can appear free of pin holes and still be breeched by liquids when voltage is applied. If the disclosed coatings are selected for use in electrowetting applications, pin hole free coatings can be advantageous, as penetration by liquids into the electrowetting display or electrowetting device can short-out the system.

The hydrophobicity of a composition, or a coating formed from a composition can be quantified, for example, by measuring the contact angle of water on a coating of the material. The contact angle is the angle at which a liquid/vapor interface meets the solid surface. Contact angle can be measured using a goniometer. In embodiments, disclosed compositions, once formed into a coating can have a contact angle of at least about 65°, of at least about 90°, at least about 100°, at least about 110°, and at least about 114°, including intermediate values and ranges.

A composition that includes a crosslinkable monomer that has more crosslinkable moieties can result in a polymer that is more highly crosslinked. Alternatively, a composition that includes more crosslinkable monomer compared to a composition that includes less crosslinkable monomer can result in a more highly crosslinked polymer. A polymer that is more highly crosslinked can be stronger than a polymer that is less crosslinked. In embodiments, dynamic mechanical analysis (DMA) can provide a quantitative means for determining the extent of film crosslinking. The amount of crosslinking in a polymer can be evaluated by measuring the crosslinking density of the polymer. The crosslink density of a polymer can be defined as the number of crosslinked monomer units per main chain. Crosslink density (Γ) can be defined as:

$$\Gamma = \frac{(\overline{M_n})_0}{(\overline{M_n})_c}$$

where $(\overline{M_n})_0$ is the number average molecular weight of uncrosslinked polymer and $(\overline{M_n})_c$ is the number average molecular weight between crosslinks. The higher the crosslink density, the more rigid and generally stronger the polymer. In embodiments, a disclosed polymer can have a crosslink density of at least about 10%, or at least about 20%.

A polymer that is more highly crosslinked can be stiffer than a polymer that is less crosslinked. The stiffness of a polymer can be measured by measuring the elastic modulus of the polymer. An elastic modulus is the description of a substance's tendency to be deformed elastically when a force is applied to it. A particular type of modulus is Young's modulus (E). Young's modulus describes tensile elasticity, or the tendency of a material to deform along an axis when opposing forces are applied along that axis; it is defined as the ratio of tensile stress to tensile strain. Commonly utilized methods of measuring the modulus of a material, such as the Young's modulus of a material can be utilized. The Young's modulus can be measured by nano-indentation, dynamic mechanical analysis, or a combination thereof.

In embodiments, a disclosed coating can have a Young's modulus, for example, of from about 1 MPa to about 200 GPa, or at least about 100 MPa, or at least about 1 GPa.

The disclosed coatings can have the advantage of a relatively high dielectric constant. The dielectric constant (k) of a material is a number relating the ability of the material to carry alternating current compared to the ability of a vacuum to carry alternating current. The dielectric constant of a material can be measured with a test capacitor. The capacitance of the test capacitor with a vacuum between the plates is measured and the capacitance of the test capacitor with the material of interest between the plates is measured. The dielectric constant is the ratio of the capacitance with the test material over the capacitance with a vacuum.

In embodiments, a disclosed coating can have a dielectric constant of at least about 1.5. In embodiments, a disclosed coating can have a dielectric constant of at least about 2. In embodiments, a disclosed coating can have a dielectric constant of at least about 4. In embodiments, a disclosed coating can have a dielectric constant of at least about 7. In embodiments, a disclosed coating can have a dielectric constant of at least about 10.

The disclosed coatings can have the advantage of a relatively high voltage breakdown. The breakdown voltage of a material is the voltage at which the current through the material suddenly increases. Catastrophic breakdown is the voltage at which the material is physically and chemically changed and is accompanied by irreversible damage. Voltage breakdown of a disclosed coating can be measured by using a metal-insulator-metal structure where the disclosed coating is sandwiched between two metallic electrodes. The voltage can be stepwise increased until catastrophic failure occurs. The catastrophic failure can be noted by, for example, arcing, popping, disintegration, or a combination thereof of the dielectric material. Disclosed films can have breakdown voltages as high as 1800 V/μm.

Voltage breakdown levels of various materials can be compared by using an accelerated voltage breakdown protocol. An accelerated breakdown can occur when water is placed in contact with an insulated electrode at relatively high voltage (for example about 125 Volts RMS) and the water penetrates to the electrode over a defined amount of time causing the disclosed coating to breakdown. In embodiments, disclosed coating can have a voltage breakdown of at least about 20 minutes of stability at 120 V, or at least about 40 minutes at 120 V. Under identical conditions TEFLON®, a commonly utilized non-crosslinked hydrophobic polymer, breaks down in 9 seconds.

In embodiments, a coating can also be advantageously utilized in certain applications if it has either a large dielectric constant or a high voltage breakdown. In embodiments, a coating has both a large dielectric constant and a high voltage breakdown. However, a relatively larger dielectric constant can compensate for a lower voltage breakdown. Similarly, a relatively higher voltage breakdown can compensate for a lower dielectric constant.

The disclosed compositions can be useful, for example, in electronic devices, optical devices, or electro-optical devices. A specific type of electro-optical application in which the compositions can be advantageously used is the field of electrowetting and dielectrophoresis. Electrowetting devices are useful in a broad range of applications, including, for example, displays, digital microfluidics, genome DNA sequencing, cell sorting, drug delivery devices, camera image stabilizers, MEMS devices, three dimensional (3D) displays, batteries, projection devices, lenses, reflective displays, sensors, lithographic apparatuses, optical beam splitters, photovoltaics, programmable fluidic processors, touch sensitive devices, micropositioning devices, and chemical microreactors, and like applications, or a combination thereof. Electrowetting technology can be advantageous in display fields, for example, because of its high switching speed, low power consumption, and bright reflective color renditions.

Articles that include the disclosed coated compositions can include, for example, an electrically isolating layer that includes the polymerized product of the compositions disclosed herein. The article can also include other optional components. For example, the electrically isolating layer can be adjacent to an electrode. In embodiments, the electrically isolating layer can be directly adjacent to an electrode. In embodiments, the electrically isolating layer can be disposed on or directly on an electrode. An electrode that can be included in the disclosed articles can be made of, for example, conductive polymers, metals, hybrid materials containing both inorganic and organic conducting agents, semiconductors such as silicon, superconductor materials, and like materials, and a combination thereof.

In embodiments an article can include an adhesion promoter. An adhesion promoter can be disposed between an electrode (or other component) and the electrically isolating layer. Exemplary adhesion promoters include, for example, DYNASYLAN® materials such as DYNASYLAN® Glymo or DYNASYLAN® DAMO-T (Evonik Degussa GmbH, Essen, Germany), and silanes that contain bonding functionalities like acrylates, amines, sulfur, vinyl, or methacrylate group (e.g., glycidoxypropyltirmethoxysilane Z-6040).

Articles can also include multiple coatings formed from the disclosed compositions. Coatings as described herein can also be applied to "free standing" front plane display devices which can be affixed to a backplane.

In embodiments, films or coatings formed from the disclosed compositions can also include surface texture on the coatings. Such nano- or microstructure can further enhance the hydrophobicity of the coating through "Lotus leaf" effects. Similarly, disclosed films or coatings can have hydrophobic materials topically applied to the exposed surface of the coating to further enhance the hydrophobic nature of the coating. In embodiments, micromachining, etching, excimer laser ablation, or combinations thereof can be utilized to introduce surface features onto a film.

Functioning of electrowetting devices are based on the ability of the dielectric film to build up a capacitive charge over the insulating layer to alter the liquid surface interaction. The change in contact angle of the interfacial liquid is directly proportional to the dielectric constant of the film and inversely proportional to the thickness of the dielectric film. For this reason, embodiments can utilize a relatively thin polymeric film having a high dielectric constant.

Advantageous embodiments may include a relatively thin coating that has a relatively large dielectric constant in order to realize as large a capacitance value as possible as seen from the equation for a parallel plate capacitor:

$$C = \frac{\varepsilon_o \varepsilon_r \cdot A}{t}$$

where $\varepsilon_o$ is the permittivity of free space, $\varepsilon_r$ is the material's relative dielectric constant, A is the plate area, and t is the film's thickness. The larger the capacitance, then the smaller the voltage needed to realize the same contact angle. It should be noted that the effective capacitance for capacitors in series is equal to the reciprocal of the sum of the reciprocals of the individual capacitors:

$$C_{eff} = \frac{1}{\frac{1}{C_1} + \frac{1}{C_2} + \ldots + \frac{1}{C_n}}$$

where $C_{eff}$ is the effective capacitance and n is the number of capacitors. This shows that for the polymer film to not limit the capacitance if used with another film, the polymer film should have a capacitance much larger than that of the other film. In embodiments the polymer film can be used as a barrier layer with another layer serving as the hydrophobic film.

The capacitive energy storage is the energy source for the electrowetting actuation. The capacitive energy storage is $$\text{Capacitive Energy} = \frac{1}{2} C_{eff} V^2$$

where V is the applied voltage. When the dielectric constant of a single-layer film is increased by a factor of G, the required applied voltage reduces by a factor of one over the square root of G. The relative dielectric constant of our insulating-material was measured to be about 7, compared to the Teflon® dielectric constant of around 1.9. This corresponds to approximately halving the required voltage.

The disclosed films can be used to make devices which use electrowetting technology. Insulating barrier films having higher dielectric constant and higher voltage breakdown (allowing a thinner film) as described above are known to require less voltage and therefore provide an opportunity to achieve low power consuming reflective displays. Such devices are needed for development of low power consuming reflective displays that rely on electrowetting technology. In addition, the above described films due to their high voltage breakdown can be used to provide digital microfluidics devices which operate at high voltages without failure.

EXAMPLES

Materials and Methods

All chemicals were obtained from Sigma-Aldrich, Milwaukee, Wis. Some of the monomers were obtained from Dajac, Sartomer, American Dye Sources Inc., or Polymer Sciences as well. All monomers and chemicals were used as-is without further purification.

Measurement of Voltage Breakdown. The films were compared to 50 nm (determined via controlled cycling of the atomic layer deposition process) zirconium dioxide inorganic films made through atomic layer deposition (ALD). The voltage breakdown of the films were measured using a sandwich assembly of the film formed on an aluminum electrode with a second aluminum electrode formed on the film. A successive series of AC voltage exposures were applied until film breakdown was visually observed.

Dielectric Constant. The dielectric constant was inferred by combining the thickness of the film (measured using a Zygo white light interferometer (Zygo Corporation, Middlefield, Conn.)) with the capacitance value measured using a LF Impedance Analyzer Model Number HP4192A (Hewlett Packard, Palo Alto, Calif.).

Water Contact Angle. Water contact angles were measured on samples of spin coated glass. Standard contact angle measurements were recorded at 5 different sites on each sample and averaged to obtain a contact angle value. The contact angles were measured on an instrument from Connelly Applied Research (Nazareth, Pa.). Advancing and receding contact angles were also measured using the sessile drop method to successively increase drop size for advancing angles and conversely to decrease drop size for receding contact angles. Each measurement was taken from a different spot on the sample to preserve the water-surface contact angle integrity. The hysteresis was determined for each sample from the data obtained. Hysteresis (H) is the difference between the advancing (θa) and the receding contact angles (θr); H=θa−θr.

Ability to perform droplet actuation via electrowetting and dielectrophoresis. The ability of the films to be used in droplet actuation via a custom voltage addressed electrode device which uses electrowetting and dielectrophoresis was also examined. In this device, a series of pulses A, B, and C are synchronized to individual electrodes that allow a pulsed movement of liquid that is in contact with the electrodes. An empirically determined degree of droplet overhang was needed to allow droplet advancement between the planar electrode pads. The devices in this study were assembled in a sandwich style format, see for example figure 25 of Muggle, F. et al., Electrowetting: from basics to applications, *J. Phys.: Condens. Matter,* 17 (2005): R705-R774.

Accelerated failure test via "time-to-hydrolysis" test. This measures the time in which water passes through the film barrier(s) and contacts the electrode to generate gas bubbles at the electrode via hydrolysis. The time in which this failure occurs ("time to hydrolysis") at a given voltage can provide a qualitative visual measure of the failure of the dielectric film barrier. Using the above described sandwich electrode droplet actuation device with a single droplet exposed to an AC voltage of 125 Volts rms, the time required to observe hydrolysis for the disclosed polymer film formulations routinely exceeded TEFLON® by more than a factor of 200.

Examples 1-10

Monomer mixtures were made by combining the monomers listed in Table 1 in the weight percents given for examples 1 through 10. Generally, the mixtures were formed by adding the cross-linkable monomer to the dielectric enhancing monomer and then adding the hydrophobic monomer.

Ten (10) 2.5 inch glass substrates (Eagle XG Glass, 1.1 mm) having an array of aluminum electrodes etched onto their surfaces were then coated with the compositions. The coating was accomplished by applying 1 mL of the solution on the substrate which was then placed over a vacuum retaining spin coating instrument. The solution was then spin coated at 2,500 RPM for 60 seconds with a 5 second ramp rate of 1,800 RPM/sec.

The samples were cured using a "Xenon Model RC-801 high intensity pulsed Ultraviolet (UV) light curing system," which employs a single lamp having a wavelength between 300 to 400 nm. The entire unit was enclosed in a chamber surrounded by a thick red curtain (UV radiation resistant). The chamber housed a purge box that held the substrates and ensured that the substrates were constantly being purged with nitrogen to create an inert environment (for the coatings) during curing. Once the glass substrates were placed in the nitrogen filled purge box, a 60 second purge time was accomplished, and then the UV chamber was closed and the coatings were cured for about 60 seconds. After curing, the substrates were inspected to ensure that they were properly cured. Re-curing was applied if needed to ensure proper curing.

The monomer percentages for examples 1 through 10 are shown in Table 1 below.

TABLE 1

| Example Number | Crosslinkable Monomer (wt %) | Hydrophobic Monomer (wt %) | Dielectric Enhancing Monomer (wt %) |
|---|---|---|---|
| 1 | M200 (20 wt %) | M300 (50 wt %) | M104 (30 wt %) |
| 2 | M200 (10 wt %) | M301 (50 wt %) | M100 (40 wt %) |
| 3 | M200 (5 wt %) | M302 (85 wt %) | M102 (10 wt %) |
| 4 | M200 (10 wt %) | M303 (70 wt %) | M100 (20 wt %) |
| 5 | M201 (10 wt %) | M304 (80 wt %) | M102 (10 wt %) |
| 6 | M202 (10 wt %) | M305 (80 wt %) | M103 (10 wt %) |
| 7 | M201 (20 wt %) | M301 (20 wt %) | M101 (60 wt %) |
| 8 | M201 (20 wt %) | M300 (40 wt %) | M100 (40 wt %) |
| 9 | M201 (25 wt %) | M303 (40 wt %) | M104 (35 wt %) |
| 10 | M202 (20 wt %) | M302 (60 wt %) | M103 (20 wt %) |

M200 = ethoxylated (15) trimethylol propane triacrylate (Sartomer, CN435)
M201 = ethoxylated (5) pentaerythritol tetraacrylate (Sigma-Aldrich, 408263)
M202 = dipentaerythritol pentacrylate (Sigma-Aldrich, 407283)
M300 = 2,2,2,3,3,4,4,5,5,6,6,7,7-dodecafluoroheptyl acrylate (Sigma-Aldrich, 474428)
M301 = 3,3,4,4,5,5,6,6,7,7,8,8,9,9,10,10,11,11,12,12,12-eicosafluorododecyl acrylate (Sigma-Aldrich, 47431-2)
M302 = 2,2,3,3,4,4,5,5-octafluoropentyl methacrylate (Sigma-Aldrich, 470988)
M303 = 2,2,3,3,4,4,5,5,6,6,7,7,8,8,9,9-hexadecafluorononyl acrylate (Sigma-Aldrich, 474436)
M304 = 4,4,5,5,6,7,7-octafluoro-2-hydroxy-6-(trifluoromethyl)heptyl methacrylate (Sigma-Aldrich, 474266)
M305 = 2,2,3,3,3-pentafluoropropyl acrylate (Sigma-Aldrich, 470961)
M100 = pentabromophenyl methacrylate (Poly Sciences, cat. # 04253)
M101 = tris(2-hydroxyethyl)isocyanurate (Sigma-Aldrich, 309001)
M102 = ethoxylated bisphenol dimethacrylate (Sigma-Aldrich, 156329)
M103 = furfuryl methacrylate (Sigma-Aldrich, 411760)
M104 = benzyl methacrylate (Poly Sciences, cat. # 02000)

The contact angles were estimated based on the particular hydrophobic monomer and the amount thereof included in the example. The modulus was estimated based on empirical determinations of other polyacrylate films that were not highly fluorinated but otherwise comparable. The predicted values for examples 1 through 10 are shown in Table 2 below.

TABLE 2

| Example Number | Contact Angle (°) | Modulus (GPa) | Dielectric Constant |
|---|---|---|---|
| 1 | >100 | 50 | 8.0 |
| 2 | >110 | 25 | 9.0 |
| 3 | >115 | 10 | 4.5 |
| 4 | >120 | 20 | 6.5 |
| 5 | >100 | 5 | 2.1 |
| 6 | >105 | 100 | 2.2 |
| 7 | >100 | 125 | 7.5 |
| 8 | >110 | 100 | 6.5 |
| 9 | >100 | 120 | 3.2 |
| 10 | >100 | 200 | 4.0 |

Example 10 was investigated further. The average standard contact angle was determined as discussed above, to be 71.8°. The average advancing contact angle was measured to be 71.4° and the average receding contact angle was measured to be 68.9°. The Hysteresis for the moderately hydrophobic polymer film was 2.5°. In comparison, TEFLON® had a contact angle with water that ranges between 114 to 118° while an inorganic $ZrO_2$ film has a contact angle near 90°. The hydrophobicity of the $ZrO_2$ film surface is significantly reduced over a short time with water contact. This was determined by comparing the decreasing contact angles from the first measured receding contact angle (78.17°) and a measurement made shortly thereafter (64.18°). This suggests that the initial hydrophobicity of some inorganic matrix may not be ideal for those applications requiring consistently high hydrophobicity.

The film of Example 10 was also evaluated as described above for the ability to perform droplet actuation via electrowetting and dielectrophoresis. The film of Example 10 was found to provide droplet actuation.

Example 11

200 mg of hexafluoro bisphenol A dimethacrylate powder (Dajac, cat. #9386) (14% by weight) was dissolved in 0.6 ml acetone and combined with 0.2 ml of pentafluorobenzyl methacrylate (Dajac, cat. #8988) (14% by weight). The mixture was gently heated to 40° C. for about 30 minutes or until fully mixed. Then 0.2 mL of dipentaerythritol penta-/hexa acrylate (Sigma-Aldrich, 407283) (16% by weight) was added to the above mixture and gently vortexed until mixed. Next 0.2 mL of furfuryl methacrylate (14% by weight) was combined and vortexed until mixed. Then 0.6 mL of 2, 2, 3, 3, 4, 4, 5, 5, 6, 6, 7, 7, 8, 8, 9, 9-hexadecafluorononyl acrylate (Sigma-Aldrich, 424266) (42% by weight) was added. A solution of 40 mg of Irgacur 818 in 0.15 ml of N-methylpyrrolidone (NMP) was then added and dissolved into the mixture. The final solution had a clear faintly amber color.

The solution was coated and cured as in Example 1. The contact angle of the film was then measured as in Example 1. The average standard contact angle was determined to be 114.4°. The average advancing contact angle was measured to be 115.5° and the average receding contact angle was measured to be 111.8°. The hysteresis for the high hydrophobic film was 3.7°.

Example 12

Example 10 above was modified by adding polyaniline powder (6 wt % based on the weight of the total composition without the polyaniline). The solution was coated and cured as in Example 1 above. The dielectric constant of the film was then measured as in Example 1 and found to be 7.

The voltage breakdown of this film was also measured and was about 1800 V/micrometer. The breakdown voltage of a 50 nm atomic layer deposition $ZrO_2$ film was found to have an average dielectric breakdown strength of 386 V/micrometer and a TEFLON® film has a reported (and measured) voltage breakdown near about 60 V/micrometer. In addition, the qualitative measurement of the "time-to-hydrolysis" test gave hydrolysis well beyond 30 minutes at 125 V RMS. For comparison, under identical accelerated breakdown voltage tests using a commercially available form of TEFLON® (DuPont) the measured a time-to-hydrolysis was about 9 seconds.

The implementations described above and other implementations are within the scope of the following claims. One skilled in the art will appreciate that the present disclosure can be practiced in embodiments other than those disclosed. The disclosed embodiments are presented for purposes of illustration and not limitation.

What is claimed is:

1. An electrode coating composition comprising:
   a polymerized product of:
   from about 5% to about 30% by weight of at least one crosslinkable monomer;
   from about 20% to about 85% by weight of at least one hydrophobic monomer; and
   at least one dielectric constant enhancing agent in an amount 2 to 60% by weight selected from the group consisting of:
   a dielectric enhancing monomer in an amount from about 10% to about 60% by weight,
   ferroelectric particulates in an amount from about 5% to about 50% by weight,
   an electroactive polymer in an amount from about 2% to about 20% by weight, and a combination thereof,
   wherein the coating has a high dielectric constant of from about 1.5 to about 10 and has a high breakdown voltage property of about 1,800 volts per micron, and wherein the dielectric constant enhancing agent comprises a mixture of an electroactive polymer consisting of polyaniline and a dielectric enhancing monomer of furfuryl methacrylate, the mixture is copolymerized with the at least one hydrophobic monomer and the at least one crosslinkable monomer in the coating.

2. The coating composition of claim 1, wherein the polyaniline is present in about 6 wt % and the furfuryl methacrylate is present in about 20 wt % based on the total weight of the composition.

* * * * *

UNITED STATES PATENT AND TRADEMARK OFFICE
CERTIFICATE OF CORRECTION

PATENT NO. : 8,920,620 B2  
APPLICATION NO. : 13/280814  
DATED : December 30, 2014  
INVENTOR(S) : Lenwood Lynell Fields et al.

Page 1 of 1

It is certified that error appears in the above-identified patent and that said Letters Patent is hereby corrected as shown below:

In the Specification

| Col. | Line | |
|---|---|---|
| 5 | 49 | After "droxyethyl) isocyanurate" insert --triacrylate,-- |
| 14 | 18 | "M101 = tris(2-hydroxyethyl)isocyanurate (Sigma-Aldrich, 309001)" should be replaced with "M101 = <u>tris (2-hydroxyethyl) isocyanurate triacrylate (Sartomer Arkema Group, SR368)</u>" |

Signed and Sealed this  
Twenty-first Day of April, 2015

Michelle K. Lee  
*Director of the United States Patent and Trademark Office*